United States Patent
Kalyanasundaram et al.

(10) Patent No.: US 11,902,034 B2
(45) Date of Patent: Feb. 13, 2024

(54) DYNAMIC ERROR RATE TARGET FOR LINK ADAPTATION

(71) Applicant: Nokia Solutions and Networks Oy, Espoo (FI)

(72) Inventors: Suresh Kalyanasundaram, Bangalore (IN); Shalini Gulati, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/106,598

(22) Filed: Feb. 7, 2023

(65) Prior Publication Data
US 2023/0254074 A1   Aug. 10, 2023

(30) Foreign Application Priority Data

Feb. 9, 2022   (FI) ...................................... 20225109

(51) Int. Cl.
| H04L 1/20 | (2006.01) |
| H04B 17/336 | (2015.01) |
| H04L 1/00 | (2006.01) |
| H04W 24/08 | (2009.01) |

(52) U.S. Cl.
CPC ........... *H04L 1/203* (2013.01); *H04B 17/336* (2015.01); *H04L 1/0026* (2013.01); *H04W 24/08* (2013.01)

(58) Field of Classification Search
CPC ..... H04L 1/203; H04L 1/0026; H04B 17/336; H04W 24/08
See application file for complete search history.

(56) References Cited

U.S. PATENT DOCUMENTS

| 2010/0273439 A1* | 10/2010 | Kawai ..................... H04L 25/06 455/113 |
| 2011/0280296 A1 | 11/2011 | Wang et al. .................. 375/227 |
| 2015/0098342 A1* | 4/2015 | Tabet .................... H04W 24/10 370/242 |
| 2015/0236808 A1 | 8/2015 | Lin et al. ......................... 72/82 |

(Continued)

FOREIGN PATENT DOCUMENTS

| CN | 1522513 A | 8/2004 |
| CN | 103596258 A | 2/2014 |

(Continued)

OTHER PUBLICATIONS

"CSI feedback enhancements for URLLC/IIoT use cases", Nokia, Nokia Shanghai Bell, 3GPP TSG RAN WG1 #104-bis-e, R1-2103434, Apr. 2021, 28 pages.

*Primary Examiner* — Ayanah S George
(74) *Attorney, Agent, or Firm* — Harrington & Smith

(57) ABSTRACT

Various example embodiments may relate to link adaptation. An apparatus may determine a first signal quality estimate for a signal. The apparatus may further determine a BLER estimate based on acknowledgements or decoding results for data blocks of the signal. The apparatus may further determine a second signal quality estimate for the signal based on the BLER estimate. The apparatus may further determine a signal quality offset based on a difference between the first signal quality estimate and the second signal quality estimate. The apparatus may further determine transmission parameter(s) for at least one subsequent data block based on the first signal quality estimate and the signal quality offset.

13 Claims, 6 Drawing Sheets

(56) References Cited

U.S. PATENT DOCUMENTS

| | | | |
|---|---|---|---|
| 2016/0143043 A1* | 5/2016 | Chendamarai Kannan ................. H04L 1/0009 370/329 | |
| 2016/0262167 A1 | 9/2016 | Lan et al. .......................... 72/85 | |
| 2016/0285536 A1 | 9/2016 | Gutierrez et al. | |
| 2016/0366696 A1* | 12/2016 | Åhlander .......... H04W 72/1273 | |
| 2019/0052396 A1 | 2/2019 | Skarby .............................. 1/203 | |
| 2019/0097750 A1 | 3/2019 | Sandberg et al. ................... 7/63 | |
| 2020/0100265 A1 | 3/2020 | Larsson et al. | |
| 2022/0353010 A1* | 11/2022 | Oved ................... H04L 1/0002 | |

FOREIGN PATENT DOCUMENTS

| | | |
|---|---|---|
| CN | 104412639 A | 3/2015 |
| CN | 113852986 A | 12/2021 |
| WO | WO-2020/215106 A2 | 10/2020 |
| WO | WO-2021/014197 A1 | 1/2021 |
| WO | WO 2021/123494 A1 | 6/2021 |
| WO | WO 2021/163162 A1 | 8/2021 |
| WO | WO-2022/149075 A1 | 7/2022 |

\* cited by examiner

DYNAMIC ERROR RATE TARGET FOR LINK ADAPTATION

TECHNICAL FIELD

Various example embodiments generally relate to the field of wireless communications. Some example embodiments relate to configuration of a dynamic block error rate (BLER) target for link adaptation.

BACKGROUND

Various wireless communication systems may apply link adaptation, for example to adjust transmission parameters based on current radio channel conditions. Link adaptation may include adapting the modulation and coding scheme (MCS), as well as the allocation of physical transmission resources, applicable for a particular user equipment (UE). In some applications, link adaptation may comprise an inner loop link adaptation (ILLA) stage for selecting a suitable MCS for the UE based on current signal-to-interference-plus-noise ratio (SINR), and an outer loop link adaptation (OLLA) stage for adapting the MCS selection to provide certain block error rate (BLER).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments improve transmission performance in a communication network. This and other benefits may be achieved by the features of the independent claims. Further example embodiments are provided in the dependent claims, the description, and the drawings.

According to a first aspect, an apparatus may comprise at least one processor; and at least one memory including computer program code; the at least one memory and the computer program code configured to, with the at least one processor, cause the apparatus at least to: determine a first signal quality estimate for a signal; determine a block error rate estimate based on acknowledgements or decoding results for a plurality of data blocks of the signal; determine a second signal quality estimate for the signal based on the block error rate estimate; determine a signal quality offset based on a difference between the first signal quality estimate and the second signal quality estimate; and determine at least one transmission parameter for at least one subsequent data block based on the first signal quality estimate and the signal quality offset.

According to an example embodiment of the first aspect, the at least one memory and the computer program code are further configured to, with the at least one processor, cause the apparatus to: determine the signal quality offset based on a time-average of the difference between the first signal quality estimate and the second signal quality estimate.

According to an example embodiment of the first aspect, the at least one memory and the computer program code are further configured to, with the at least one processor, cause the apparatus to: transmit, by an access node, the signal to a device; receive a channel quality indicator associated with the signal from the device; and determine the first signal quality estimate based on the channel quality indicator.

According to an example embodiment of the first aspect, the at least one memory and the computer program code are further configured to, with the at least one processor, cause the apparatus to: receive, by an access node, the signal from a device; equalize the signal; and determine the first signal quality estimate based on the equalized signal.

According to an example embodiment of the first aspect, the at least one memory and the computer program code are further configured to, with the at least one processor, cause the apparatus to: recursively determine the block error rate estimate based on a previous block error rate estimate and an acknowledgement or decoding result of a current data block.

According to an example embodiment of the first aspect, the at least one memory and the computer program code are further configured to, with the at least one processor, cause the apparatus to: increase the block error rate estimate, in response to a negative acknowledgement of the current data block or in response to unsuccessful decoding of the current data block.

According to an example embodiment of the first aspect, the at least one memory and the computer program code are further configured to, with the at least one processor, cause the apparatus to: recursively determine the block error rate based on a weighted sum of the previous block error rate estimate and an output of an indicator function, wherein the indicator function is configured output a positive value for a negative acknowledgement or unsuccessful decoding of the current data block and a substantially zero value for a positive acknowledgement or successful decoding of the current data block.

According to an example embodiment of the first aspect, the at least one memory and the computer program code are further configured to, with the at least one processor, cause the apparatus to: increment the signal quality offset periodically or at irregular intervals.

According to an example embodiment of the first aspect, the at least one memory and the computer program code are further configured to, with the at least one processor, cause the apparatus to: increment the signal quality offset periodically or at irregular intervals, in response to determining the block error rate estimate to be lower than or equal to a threshold.

According to an example embodiment of the first aspect, the first signal quality estimate comprises a first signal-to-interference-plus-noise ratio estimate, the second signal quality estimate comprises a second signal-to-interference-plus-noise ratio estimate, and the signal quality offset comprises a signal-to-interference-plus-noise ratio offset.

According to an example embodiment of the first aspect, the at least one transmission parameter comprises a modulation and/or a forward error correction coding scheme.

According to an example embodiment of the first aspect, the block error rate estimate is determined based on acknowledgements or decoding results for a plurality of non-retransmitted data blocks of the signal.

According to a second aspect, a method may comprise: determining a first signal quality estimate for a signal; determining a block error rate estimate based on acknowledgements or decoding results for a plurality of data blocks of the signal; determining a second signal quality estimate for the signal based on the block error rate estimate; determining a signal quality offset based on a difference between the first signal quality estimate and the second signal quality estimate; and determining at least one transmission parameter for at least one subsequent data block based on the first signal quality estimate and the signal quality offset.

According to an example embodiment of the second aspect, the method further comprises: determining the signal quality offset based on a time-average of the difference between the first signal quality estimate and the second signal quality estimate.

According to an example embodiment of the second aspect, the method further comprises: transmitting, by an access node, the signal to a device; receiving a channel quality indicator associated with the signal from the device; and determining the first signal quality estimate based on the channel quality indicator.

According to an example embodiment of the second aspect, the method further comprises: receiving, by an access node, the signal from a device; equalizing the signal; and determining the first signal quality estimate based on the equalized signal.

According to an example embodiment of the second aspect, the method further comprises: recursively determining the block error rate estimate based on a previous block error rate estimate and an acknowledgement or decoding result of a current data block.

According to an example embodiment of the second aspect, the method further comprises: increasing the block error rate estimate, in response to a negative acknowledgement of the current data block or in response to unsuccessful decoding of the current data block.

According to an example embodiment of the second aspect, the method further comprises: recursively determining the block error rate based on a weighted sum of the previous block error rate estimate and an output of an indicator function, wherein the indicator function is configured output a positive value for a negative acknowledgement or unsuccessful decoding of the current data block and a substantially zero value for a positive acknowledgement or successful decoding of the current data block.

According to an example embodiment of the second aspect, the method further comprises: incrementing the signal quality offset periodically or at irregular intervals.

According to an example embodiment of the second aspect, the method further comprises: incrementing the signal quality offset periodically or at irregular intervals, in response to determining the block error rate estimate to be lower than or equal to a threshold.

According to an example embodiment of the second aspect, the first signal quality estimate comprises a first signal-to-interference-plus-noise ratio estimate, the second signal quality estimate comprises a second signal-to-interference-plus-noise ratio estimate, and the signal quality offset comprises a signal-to-interference-plus-noise ratio offset.

According to an example embodiment of the second aspect, the at least one transmission parameter comprises a modulation and/or a forward error correction coding scheme.

According to an example embodiment of the second aspect, the block error rate estimate is determined based on acknowledgements or decoding results for a plurality of non-retransmitted data blocks of the signal.

According to a third aspect a computer program or a computer program product comprises instructions for causing an apparatus to perform at least the following: determining a first signal quality estimate for a signal; determining a block error rate estimate based on acknowledgements or decoding results for a plurality of data blocks of the signal; determining a second signal quality estimate for the signal based on the block error rate estimate; determining a signal quality offset based on a difference between the first signal quality estimate and the second signal quality estimate; and determining at least one transmission parameter for at least one subsequent data block based on the first signal quality estimate and the signal quality offset. The computer program may further comprise instructions for causing the apparatus to perform any example embodiment of the method of the second aspect.

According to a fourth aspect an apparatus comprises: means for determining a first signal quality estimate for a signal; means for determining a block error rate estimate based on acknowledgements or decoding results for a plurality of data blocks of the signal; means for determining a second signal quality estimate for the signal based on the block error rate estimate; means for determining a signal quality offset based on a difference between the first signal quality estimate and the second signal quality estimate; and means for determining at least one transmission parameter for at least one subsequent data block based on the first signal quality estimate and the signal quality offset. The apparatus may further comprise means for performing any example embodiment of the method of the second aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Figure 1:
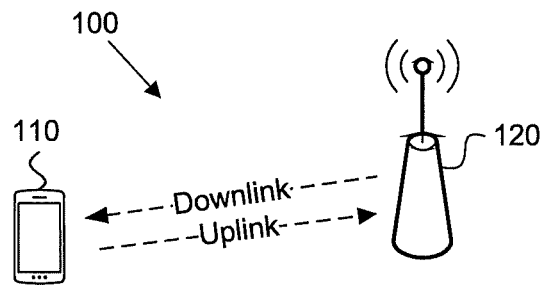
FIG. 1 illustrates an example of a communication network.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Due to changing radio conditions, cellular communication networks, such as for example long-term evolution (LTE) or 5G networks specified by the 3rd Generation Partnership Project (3GPP), may be configured with dynamic adaptation of modulation and coding scheme (MCS) in order to optimize performance through use of such link adaptation mechanism.

Link adaptation may include two stages: inner loop link adaptation (ILLA) and an outer loop link adaptation (OLLA). A purpose of OLLA may be to maintain a target error (e.g. BLER) setting. For example, a static initial target BLER setting of 10% may be used, implying that a receiver is expected to receive 90% of transmissions correctly without retransmission. An objective of link adaptation may be to maximize system capacity by adaptation of MCS, and optionally physical resource blocks (PRB), in accordance with changing radio conditions.

Modulation scheme may refer to applying a particular modulation method, for example a particular type (e.g. quadrature amplitude modulation) or order of constellation for mapping binary data to real and/or imaginary parts of real or complex-valued modulation symbols. Order of modulation or constellation may define the number of bits carried by one modulation symbol. Coding scheme may for example comprise a particular code rate of a forward error correction (FEC) code. Modulation and coding schemes may be indexed, for example in increasing order of spectral efficiency, such that each MCS index, MCS i, denotes a particular combination of modulation and coding schemes. MCS i+1 may therefore carry more information bits per second for a certain bandwidth than MCS i.

Transmission resources of the physical layer (PHY) may comprise time and/or frequency resources. An example of a frequency resource is a subcarrier of an orthogonal frequency division multiplexing (OFDM) symbol. An example of a time resource is the OFDM symbol. A resource element (RE) may for example comprise one subcarrier position during one OFDM symbol. A resource element may be configured to carry one modulation symbol, for example a QAM symbol, comprising a real and/or an imaginary parts of the modulation symbol. Transmission resources may be assigned in blocks of resource elements. A PRB may comprise a group of resource elements (e.g. 168 REs corresponding to 12 subcarriers in 14 OFDM symbols).

While link adaptation with a static BLER target may improve transmission performance to some extent, the optimal BLER may change along with radio channel conditions and the use of static target BLER setting may result in selection of a sub-optimal MCS that may not result in achieving maximum throughout, for example for a given SINR value. Example embodiments of the present disclosure therefore provide methods for dynamically adapting the BLER target. For example, an optimal BLER target that is dependent on estimated SINR may be used considering the objective of maximizing throughput subject to a maximum BLER constraint.

According to an example embodiment, an apparatus may determine a first signal quality estimate (e.g. SINR estimate) for a signal. The apparatus may further determine a BLER estimate based on acknowledgements or decoding results for data blocks of the signal. The apparatus may further determine a second signal quality estimate for the signal based on the BLER estimate. The apparatus may further determine a signal quality offset based on a difference between the first signal quality estimate and the second signal quality estimate. The apparatus may further determine transmission parameter(s), e.g. MCS, for at least one subsequent data block based on the first signal quality estimate and the signal quality offset.

Methods are therefore disclosed for example for determining an optimal MCS and an optimal BLER operating point for any SINR value based on the objective of maximizing throughput under a specified BLER constraint. To enable this, for example HARQ (hybrid automatic repeat request) responses for non-retransmitted data blocks may be used for estimating the BLER, for example, through a first order infinite impulse response (IIR) filtering mechanism. The estimated BLER may be used to estimate a SINR value, for example from an appropriate link curve, and if the inner-loop SINR does not match with the estimated SINR, the difference between the inner-loop SINR and the estimated SINR may computed as delta-SINR. Further, the delta-SINR value may be time-averaged to smooth out sudden or spurious SINR variations. The inner-loop SINR corrected by the average delta-SINR (e.g. a sum of inner-loop SINR and the average delta-SINR) may be used for MCS selection.

Further, for example if the operating BLER is close to 0%, e.g. 0.1%, 0.5%, or 1%, the next higher MCS index may be probed by adding a small delta amount to the average delta-SINR, in order to explore the possibility that the SINR has improved. Improvement of the SINR may not get reflected in the BLER, because of the operation close to 0% BLER. This enables to further improve throughput. If the higher MCS index can not be sustained, the average delta-SINR is reduced, thus causing the link adaptation method to change back to a lower MCS and operation close to the currently prevailing SINR. These and other features will be further described below with reference to the drawings.

FIG. 1 illustrates an example of a communication network. Communication network 100 may comprise one or more devices, which may be also referred to as client nodes, user nodes, or user equipment (UE). An example of a device is UE 110, which may communicate with one or more access nodes or access points, represented in this example by a 5th generation access node (gNB) 120, over wireless radio channel(s). Communications between UE 110 and gNB 120 may be bidirectional and hence any of these entities may be configured to operate as a transmitter and/or a receiver. Transmissions from gNB 120 to UE 110 may be referred to as downlink transmissions or downlink signals. Transmissions from UE 110 to gNB 120 may be referred to as uplink transmissions or uplink signals.

Communication network 100 may further comprise one or more core network elements (not shown), for example network nodes, network devices, or network functions. The core network may for example comprise an access and mobility management function (AMF) and/or user plane function (UPF), which enable gNB 120 to provide various communication services for UE 110. The gNB 120 may be configured to communicate with the core network elements over a communication interface, such as for example a control plane interface and/or a user plane interface (e.g. NG-C/U).

Access nodes, such as gNB 120, may be also called base stations or a radio access network (RAN) nodes and they may be part of a RAN between the core network and UE 110. Functionality of an access node may be distributed between a central unit (CU), for example a gNB-CU, and one or more distributed units (DU), for example gNB-DUs. It is therefore appreciated that access node functionality described herein may be implemented at a gNB, or divided between a gNB-CU and a gNB. Network elements such gNB, gNB-CU, and gNB-DU may be generally referred to as network nodes or network devices. Although depicted as a single device, a network node may not be a stand-alone device, but for example a distributed computing system coupled to a remote radio head. For example, a cloud radio access network (cRAN) may be applied to split control of wireless functions to optimize performance and cost.

Data communication in communication network 100 may be based on a protocol stack comprising various communication protocols and layers. Layers of the protocol stack may be configured to provide certain functionalities, for example based on the Open Systems Interconnection (OSI) model or a layer model of a particular standard.

In one example, the protocol stack may comprise a service data adaptation protocol (SDAP) layer, which may, at the transmitter side, receive data from an application layer for transmission, for example one or more data packets. The SDAP layer may be configured to exchange data with a PDCP (packet data convergence protocol) layer. The PDCP layer may be responsible of generation of PDCP data packets, for example based on data obtained from the SDAP layer.

A radio resource control (RRC) layer, provided for example on top of the PDCP layer, may be configured to implement control plane functionality. RRC may refer to provision of radio resource related control data. RRC messages may be transmitted on various logical control channels such as for example a common control channel (CCCH) or a dedicated control channel (DCCH).

The PDCP layer may provide data to one or more instances of a radio link control (RLC) layer. For example, the PDCP data packets may be transmitted on one or more RLC transmission legs. RLC instance(s) may be associated with corresponding medium access control (MAC) instances of the MAC layer. The MAC layer may deliver the data to the physical layer for transmission.

The MAC layer may provide a mapping between logical channels of the upper layer(s) and transport channels, such as for example broadcast channel (BCH), paging channel (PCH), downlink shared channel (DL-SCH), uplink shared channel (UL-SCH), or random access channel (RACH). The MAC layer may be further configured to handle multiplexing and demultiplexing of MAC service data units (SDU). Furthermore, the MAC layer may provide error correction functionality based on packet retransmissions, for example according to the hybrid automatic repeat request (HARQ) process. In case of HARQ, UE 110 may transmit HARQ feedback, e.g. a positive acknowledgement (ACK) indicative of successful reception of a block of data (e.g. a MAC packet) or a negative acknowledgement (NACK) indicative of unsuccessful reception of a block of data. Based on the HARQ feedback, gNB 120 may retransmit the relevant block(s) of data to UE 110. HARQ feedback, e.g. number or proportion of NACKs, may be therefore used for estimating the currently achievable BLER. The MAC layer may also carry control information, for example in MAC control elements (CE). This enables fast exchange of control information at the MAC layer without involving the upper layers.

The physical layer (Layer 1) may provide data transmission services on physical layer channels such as for example the physical broadcast channel (PBCH), physical downlink control channel (PDCCH), physical downlink shared channel (PDSCH), physical uplink control channel (PUCCH), physical uplink shared channel (PUSCH), or physical random access channel (PRACH). The physical layer may for example perform modulation, FEC coding, define a physical layer frame structure, etc., to transmit upper layer data at the physical channels. The physical channels may carry the transport channels. The physical layer may also carry signalling information, for example downlink control information (DCI). DCI may therefore comprise physical layer signalling information. DCI may be carried for example on PDCCH. DCI may include information about uplink resource allocation and/or information about downlink transmissions targeted to UE 110. DCI may be used by gNB 120 for example to schedule an uplink grant for UE 110, i.e., to inform UE 110 about transmission resources (e.g. subcarriers of particular OFDM symbols) assigned to UE 110 for uplink transmission. DCI may further indicate transmission parameters (e.g. MCS) to be used by UE 110 for receiving downlink signals or transmitting uplink signals.

Communication network 100 may be configured for example in accordance with the 5th generation (5G) digital cellular communication network, as defined by 3GPP. In one example, the communication network 100 may operate according to 3GPP 5G NR (New Radio). It is however appreciated that example embodiments presented herein are not limited to this example network and may be applied in any present or future wireless or wired communication networks, or combinations thereof, for example other type of cellular networks, short-range wireless networks, broadcast or multicast networks, or the like.

Figure 2:
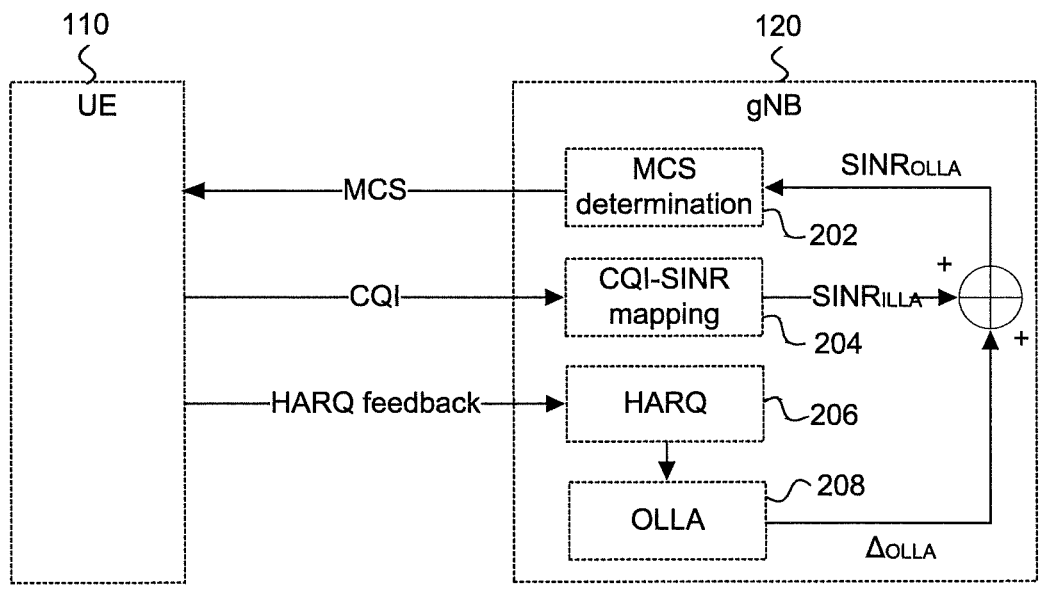
FIG. 2 illustrates an example of downlink link adaptation.

FIG. 2 illustrates an example of downlink adaptation. In downlink link adaptation, transmission parameter(s), e.g. MCS, may be determined for downlink transmission. UE 110 may estimate channel state information (CSI) of the downlink radio channel, for example based on reference signals transmitted by gNB 120. UE 110 may report the CSI to UE 110, for example as a channel quality indicator (CQI). CQI may indicate the most spectrally efficient modulation and coding rate (MCS) applicable for achieving the required block error rate (BLER) for given channel conditions. UE 110 may also transmit HARQ feedback to gNB 120. The HARQ feedback may indicate whether blocks of data (e.g. MAC packets) were successfully received or not. UE 110 may determine whether a data block was successfully received (e.g. decoded) for example based on a cyclic redundancy check (CRC) code of the data block or based on successful decoding of the data block by a FEC decoder.

The CQI received from UE 110 may be used for ILLA at gNB 120. For example, CQI-SINR mapping function 204 may determine the SINR of the downlink transmission at UE 110 corresponding to the CQI. This SINR value may be denoted by $SINR_{ILLA}$. HARQ function 206 may receive HARQ feedback from UE 110. The HARQ feedback may be associated with blocks of data transmitted by gNB 120 to UE 110 at the downlink. The gNB 120 may retransmit non-acknowledged blocks of data. The HARQ feedback may be also delivered to OLLA function 208, which may determine based on the received HARQ feedback, an OLLA offset ($\Delta_{OLLA}$) to be applied to the inner-loop SINR estimate ($SINR_{ILLA}$). The OLLA offset may be for example increased for each ACK and decreased for each NACK. The OLLA offset may be added to the inner loop SINR value to obtain an outer loop SINR value: $SINR_{OLLA} = SINR_{ILLA} + \Delta_{OLLA}$.

Finally, MCS determination function 202 may select modulation and/or code rate to be used for downlink transmissions. An indication of the selected MCS may be transmitted by gNB 120 to UE 110, for example in DCI.

Figure 3:
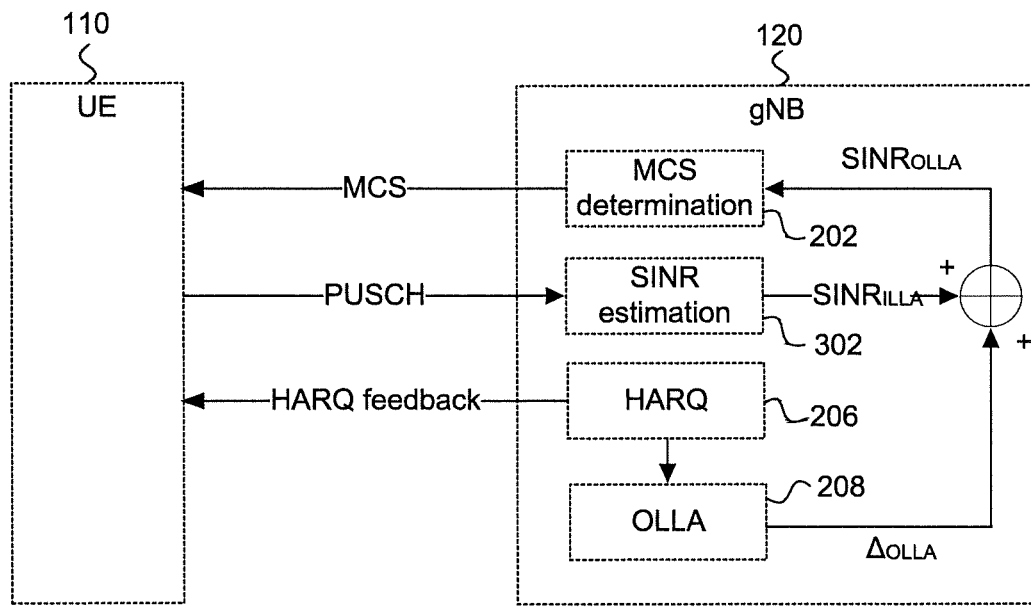
FIG. 3 illustrates an example of uplink link adaptation.

FIG. 3 illustrates an example of uplink link adaptation. In uplink link adaptation transmission parameter(s) may be determined for uplink transmission. UE 110 may transmit data to gNB 120 on the uplink, for example on PUSCH. SINR estimation function 302 at gNB 120 may estimate the SINR of the uplink transmission, for example based on reference signals transmitted by UE 110. This SINR estimate may be used as the inner-loop SINR ($SINR_{ILLA}$). HARQ function 206 may determine and transmit HARQ feedback for blocks of data received from UE 110 at the uplink. The HARQ feedback may be determined for example based on decoding results from uplink packet decoding. The HARQ feedback may be also provided to OLLA function 208. Otherwise the ILLA and OLLA may operate similar to FIG. 2 and comprise similar functions 202 and 208.

Figure 4:
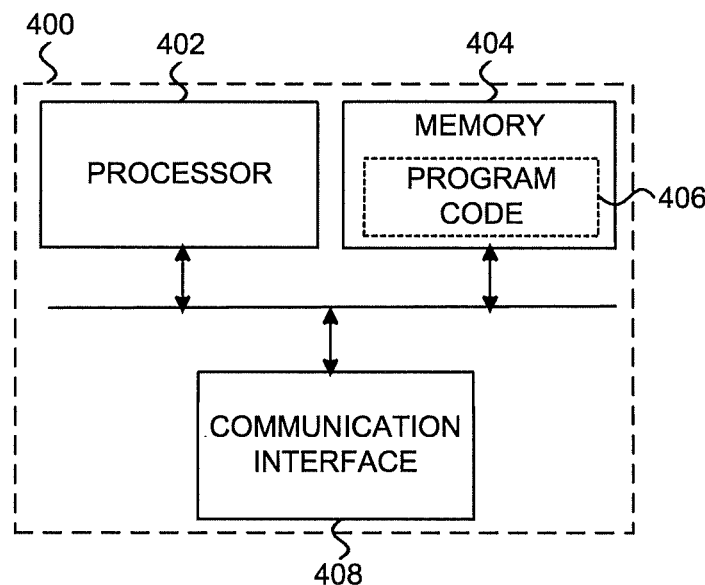
FIG. 4 illustrates an example of an apparatus configured to practice one or more example embodiments.

FIG. 4 illustrates an example embodiment of an apparatus 400, for example UE 110, gNB 120, or a component or a chipset of UE 110 or gNB 120. Apparatus 400 may comprise at least one processor 402. The at least one processor 402 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Apparatus 400 may further comprise at least one memory 404. The at least one memory 404 may be configured to store, for example, computer program code or the like, for example operating system software and application software. The at least one memory 404 may comprise one or more volatile memory devices, one or more non-volatile memory devices, and/or a combination thereof. For example, the at least one memory 404 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 400 may further comprise a communication interface 408 configured to enable apparatus 400 to transmit and/or receive information to/from other devices. In one example, apparatus 400 may use communication interface 408 to transmit or receive signaling information and/or data in accordance with at least one cellular communication protocol. Communication interface 408 may be configured to provide at least one wireless radio connection, such as for example a 3GPP mobile broadband connection (e.g. 3G, 4G, 5G, 6G). However, communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. Communication interface 408 may comprise, or be configured to be coupled to, an antenna or a plurality of antennas to transmit and/or receive radio frequency signals. One or more of the various types of connections may be also implemented as separate communication interfaces, which may be coupled or configured to be coupled to an antenna or a plurality of antennas.

Apparatus 400 may further comprise a user interface comprising an input device and/or an output device. The input device may take various forms such a keyboard, a touch screen, or one or more embedded control buttons. The output device may for example comprise a display, a speaker, a vibration motor, or the like.

When apparatus 400 is configured to implement some functionality, some component and/or components of apparatus 400, such as for example the at least one processor 402 and/or the at least one memory 404, may be configured to implement this functionality. Furthermore, when the at least one processor 402 is configured to implement some functionality, this functionality may be implemented using program code 406 comprised, for example, in the at least one memory 404.

The functionality described herein may be performed, at least in part, by one or more computer program product components such as for example software components. According to an embodiment, the apparatus comprises a processor or processor circuitry, such as for example a microcontroller, configured by the program code when executed to execute the embodiments of the operations and functionality described. A computer program or a computer program product may therefore comprise instructions for causing, when executed, apparatus 400 to perform the method(s) described herein. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

Apparatus 400 comprises means for performing at least one method described herein. In one example, the means comprises the at least one processor 402, the at least one memory 404 including program code 406 configured to, when executed by the at least one processor, cause the apparatus 400 to perform the method. Apparatus 400 may for example comprise means for generating, transmitting, and/or receiving wireless communication signals, for example modulation circuitry, demodulation circuitry, radio frequency (RF) circuitry, or the like. The circuitry(ies) may be coupled to, or configured to be coupled to, one or more antennas to transmit and/or receive the wireless (radio) communication signals over an air interface.

Apparatus 400 may comprise a computing device such as for example an access point, a base station, a mobile phone, a smartphone, a tablet computer, a laptop, an internet of things (IoT) device, or the like. Examples of IoT devices include, but are not limited to, consumer electronics, wearables, sensors, and smart home appliances. In one example, apparatus 400 may comprise a vehicle such as for example a car. Although apparatus 400 is illustrated as a single device it is appreciated that, wherever applicable, functions of apparatus 400 may be distributed to a plurality of devices, for example to implement example embodiments as a cloud computing service.

Figure 5:
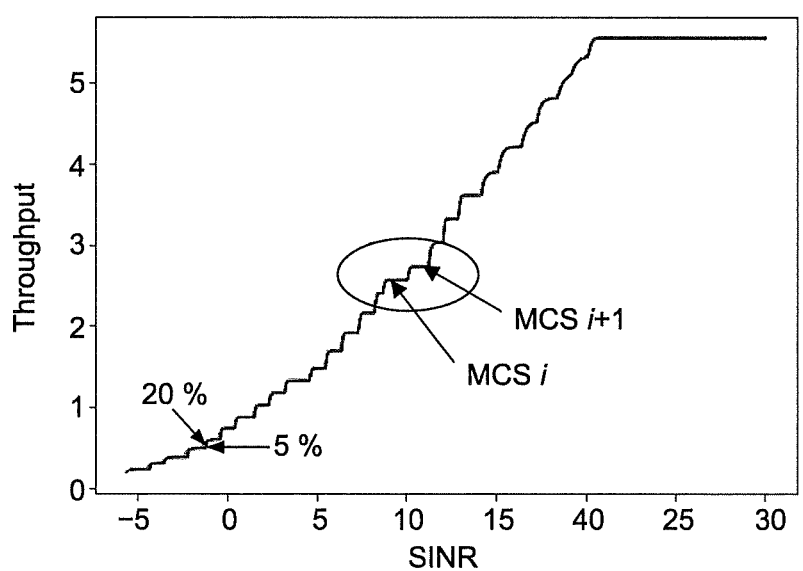
FIG. 5 illustrates an example of optimal throughput for a range of SINR values with BLER constraints 5% and 20%.

FIG. 5 illustrates an example of optimal throughput for a range of SINR values with BLER constraints 5% and 20%.

Discontinuities in the throughput correspond to different MCS indices, e.g. a switch from MCS i to MCS i+1. As noted above, MCS selection may be performed by gNB 120 based on an estimated SINR value. For downlink, the CQI value received from UE 100, or an equivalent wideband SINR value mapping to the CQI value, may be utilized for MCS selection. For uplink, gNB 120 may use for example received PUSCH SINR for MCS selection. For both downlink and uplink, this received SINR value along with the additional OLLA offset ($\Delta_{OLLA}$) may be used for MCS selection. MCS may be for example selected such that the target BLER setting is achieved in the long run. MCS selection may comprise selection or adjustment of either modulation or coding scheme, or both.

To achieve the objective of maximizing throughput, optimal MCS and optimal BLER operating point may be determined based on the estimated SINR, for example as follows:

$$\max_{i \in MCS\ indices} SE_i(1 - BLER_i(SINR)), \quad (1)$$

where $SE_i$ is the maximum spectral efficiency achievable by MCS index i, where $BLER_i(SINR)$ is the BLER of MCS index i at the estimated SINR, and where $BLER_i \in [0,1]$. Therefore, an optimal MCS at that SINR may be selected by finding the MCS that maximizes a scaled spectral efficiency of MCS index i. The scaled spectral efficiency may comprise the spectral efficiency of that MCS index, scaled by the proportion of correctly received data blocks for that MCS index, given the estimated SINR. This may be formally expressed for example as follows:

$$i^* = \arg\max_{i \in MCS\ indices} SE_i(1 - BLER_i(SINR)). \quad (2)$$

The target BLER may be then determined by $BLER_{i^*}(SINR)$. The optimal BLER may change depending on the SINR value, and therefore use of a static target BLER setting may result in selection of a sub-optimal MCS index, thereby preventing the link adaptation system from achieving the maximum throughout for the given SINR value. Instead for the considered SINR value (corrected by an OLLA offset), system performance may be improved if gNB 120 is enabled to correctly choose the MCS that results in the maximum throughput, while satisfying a specified BLER constraint.

Figure 6:
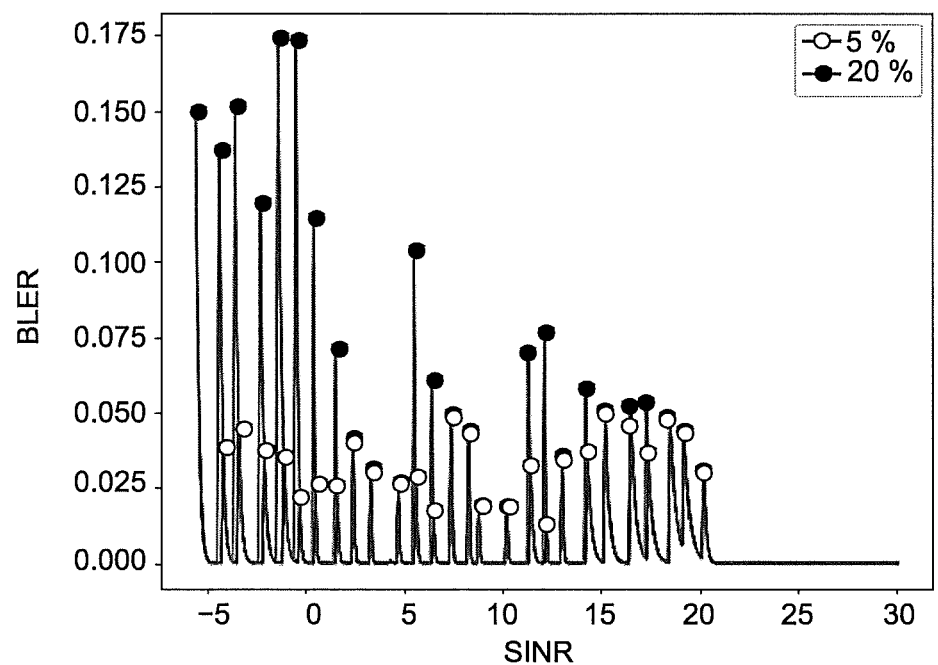
FIG. 6 illustrates an example of optimal BLER for a range of SINR values with BLER constraints 5% and 20%.

FIG. 6 illustrates an example of optimal BLER for a range of SINR values with BLER constraints 5% and 20%. The BLER curves correspond to the optimal BLER ($BLER_{i^*}(SINR)$) computed based on Equation (2) as a function of SINR. The BLER values are optimal BLER values, i.e., the BLER values correspond to the MCS that maximizes throughput under the specified BLER constraint. FIG. 6 shows that the optimal BLER varies quite widely over a large range and is also quite sensitive to SINR. Using a single BLER target may be therefore sub-optimal. Further with a maximum BLER constraint of 5%, as expected, the optimal BLER does not exceed the set target of 5%, while the optimal BLER without any constraints (or 20% max BLER constraint, for example) exceeds the 5% target. However, at other points, the BLER curve for 5% BLER constraint follows the optimal BLER of the case with 20% maximum BLER. Moreover, though variation in optimal BLER happens across the entire range of SINR values, optimal BLER values are, on average, lower at higher SINR values.

Figure 7:
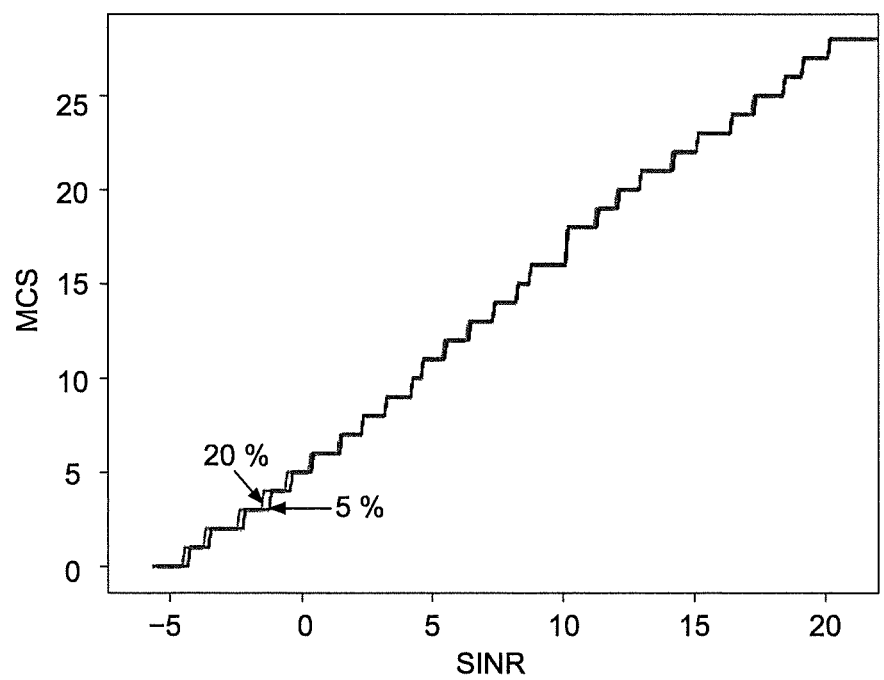
FIG. 7 illustrates an example of an optimal index of MCS for a range of SINR values with BLER constraints 5% and 20%.

FIG. 7 illustrates an example of an optimal index of MCS for a range of SINR values with BLER constraints 5% and 20%. Application of a single target BLER may cause the link adaptation algorithm to choose sub-optimal MCSs. For example, if the optimal BLER at a given SINR corresponds to a certain MCS, say MCS i, with 0% BLER, and at the same SINR, the BLER of MCS i+1 is 100%, then forcing a 10% BLER may result in the link adaptation algorithm choosing MCS i+1 10% of the time. The resultant throughput would then be 10% lower than necessary.

Similarly, if the optimal BLER at a given SINR corresponds to MCS i with 20% BLER, and at the same SINR, the BLER of MCS i−1 is 0%, then forcing a 10% BLER may result in the link adaptation algorithm choosing MCS i−1 50% of the time. Accordingly, the resultant throughput would be lower depending on the spectral efficiency of the two MCSs.

In the results that follow, MCS is chosen to maximize the throughput for any SINR, while satisfying a specified BLER constraint. For example, FIG. 7 shows the selected MCS that maximizes the throughput for a given SINR value. As expected, the selected MCS increases with an increase in the SINR and the curve is discontinuous at certain SINR values. The discontinuities occur because at these SINR values the chosen MCS index increases by one. The curve of FIG. 7 has been plotted for two different maximum BLER constraints of 5% and 20%. It is seen that the maximum BLER setting of 5% jumps to a higher MCS at a larger SINR value for some MCSs, in order to honour the maximum BLER constraint (especially at lower SINR values).

Next, the throughput at a given SINR is estimated with a fixed target BLER of $BLER_{target}$ using "randomized" policies as follows: Let us denote by MCS i an MCS for which $BLER_i(SINR) \leq BLER_{target}$ and $BLER_{i+1}(SINR) > BLER_{target}$. Let us denote by $P_i$ the probability of choosing MCS i. With probability $1 - P_i$, MCS i+1 is chosen. A link adaptation scheme configured with a fixed target BLER will be therefore forced to pick MCS i with a probability $P_i$ and MCS i+1 with a probability $1 - P_i$, where $P_i$ is given by $$P_i \times BLER_i(SINR) + (1 - P_i) \times BLER_{i+1}(SINR) = BLER_{target}. \quad (3)$$

Figure 8:
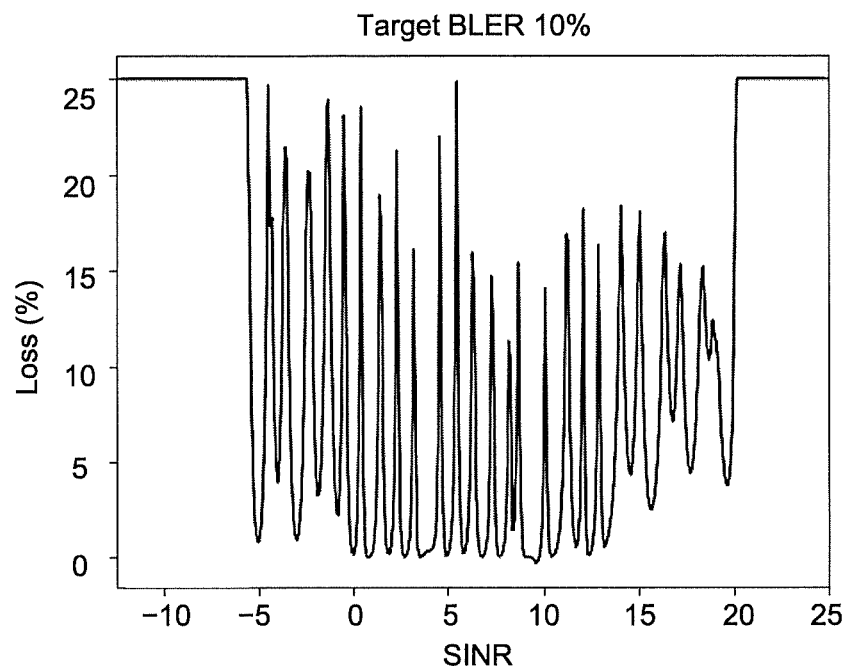
FIG. 8 illustrates an example of a loss incurred by a randomized policy algorithm with respect to optimal algorithm with target BLER of 10%.
Figure 9:
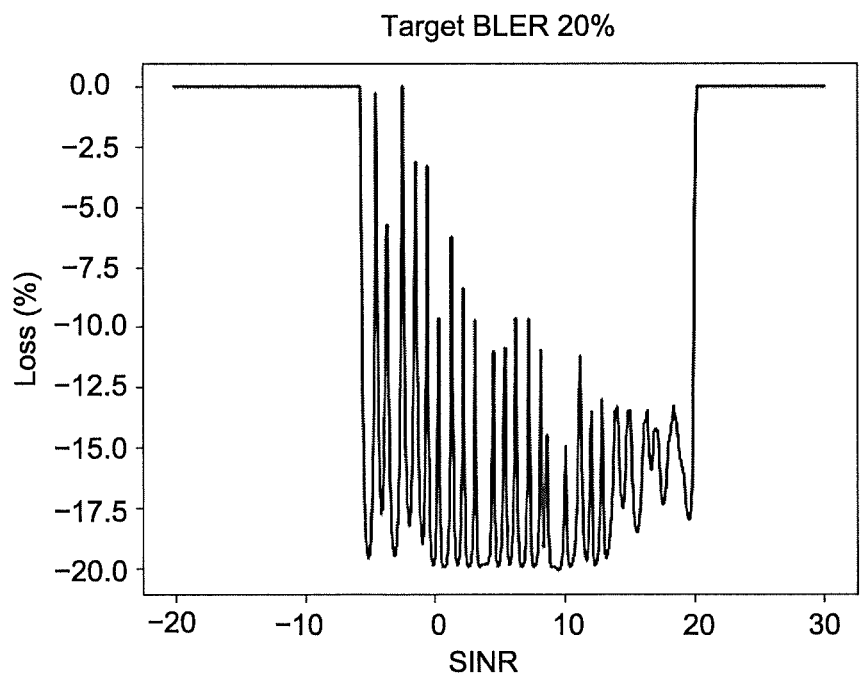
FIG. 9 illustrates an example of a loss incurred by a randomized policy algorithm with respect to optimal algorithm with target BLER of 20%.

FIG. 8 illustrates an example of a loss incurred by the randomized policy algorithm with respect to optimal algorithm with target BLER of 10%. The loss incurred in throughput for a fixed BLER target scheme, resulting from the use of the randomized algorithm described above, is plotted with respect to an algorithm that maximizes the throughput across the range of SINR values. The graph shows the loss in throughput (in per cents) as a function of SINR when there is a fixed BLER target of 10%. The loss is as large as 10%, caused primarily by the OLLA scheme picking a higher MCS with 100% BLER for 10% of the time to reach the 10% BLER target, resulting in up to a 10% loss in throughput. Instead if a fixed BLER target of 20% is used, the loss increases up to 20% as shown in FIG. 9. Average loss in throughput may be therefore substantial in practice.

To circumvent the above challenges caused by a static target BLER setting, and to improve the achieved throughput, the example embodiments of the present disclosure provide a dynamic BLER target based OLLA algorithm. The example embodiments of the algorithm may update the BLER estimate based on received HARQ feedback on first transmissions, i.e., transmissions that are not retransmissions. Further, the updated BLER estimate may be used to determine a SINR value that results in the estimated BLER. This estimated SINR may be then compared to the inner-loop SINR value and this difference may be computed as a delta-SINR value. Further, the inner-loop SINR estimate corrected by the time averaged version of delta-SINR may be used to determine the MCS, as will be further described with reference to FIG. 10.

Figure 10:
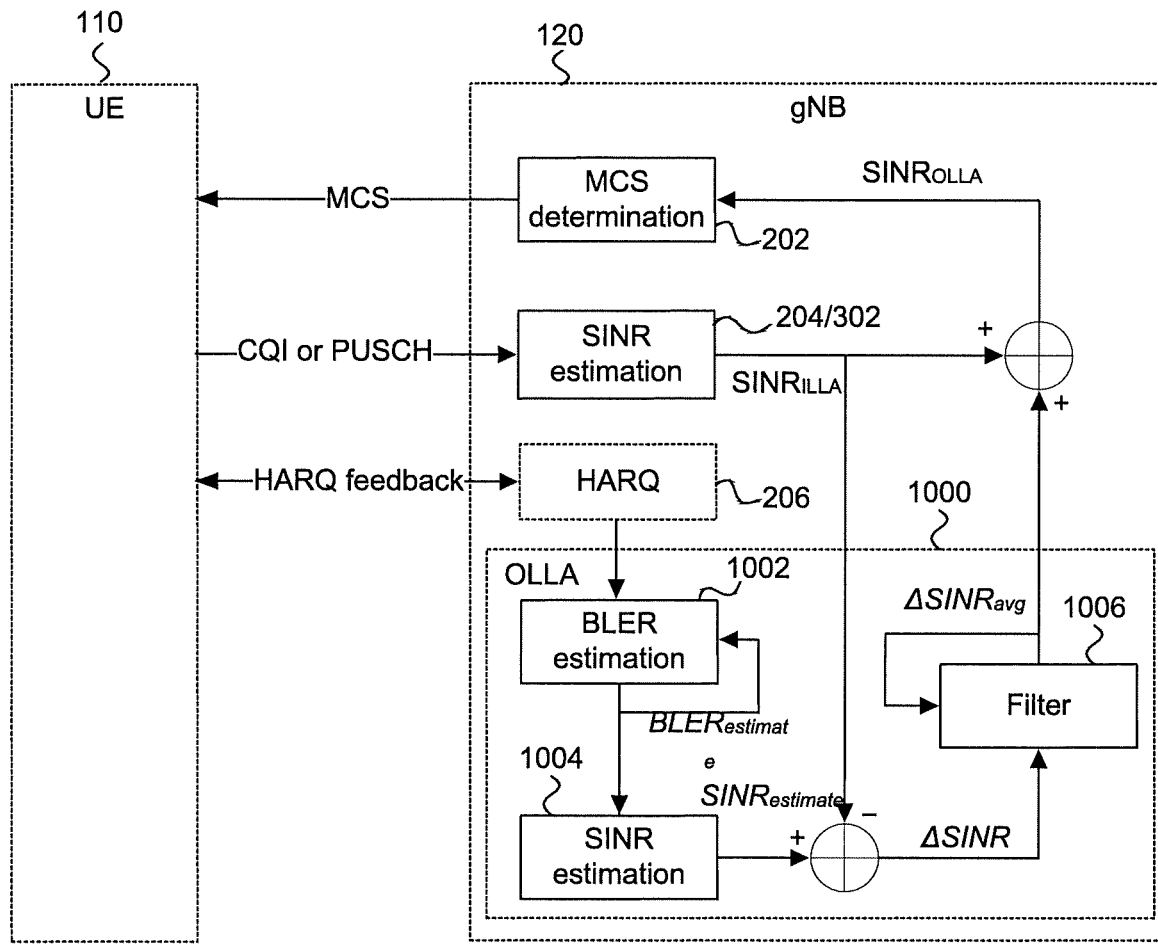
FIG. 10 illustrates an example of link adaptation with dynamic BLER target.

FIG. 10 illustrates an example of link adaptation with dynamic BLER target. The gNB 120 may comprise functions 202, 204 or 302, and 206 similar to those of FIG. 2 or FIG. 3. The gNB 120 may be therefore configured to perform at least one of downlink or uplink link adaptation.

SINR estimation function 204/302 may estimate SINR$_{ILLA}$ based on a CQI associated with a signal transmitted by gNB 120 to UE 110, as described with reference to FIG. 2 (CQI-SINR mapping). Alternatively, SINR$_{ILLA}$ may be estimated based on a signal received from UE 110, for example on PUSCH, as described with reference to FIG. 3. In this case, SINR$_{ILLA}$ may be estimated for example based on post-equalized SINR from Layer 1. Upon reception of the signal from UE 110, gNB 120 may equalize the received signal and determine SINR$_{ILLA}$ based on the equalized signal. Equalization of the signal may comprise determining a channel estimate, for example based on uplink reference signals, and processing the received signal by an inverse of the channel estimate. For example, in case of OFDM, gNB 120 may multiply each received modulation symbol by an inverse of the channel estimate for that modulation symbol (one-tap equalization). SINR may be estimated for example based on differences between receive modulation symbols and assumed respective modulation symbols transmitted by UE 110. It is noted that SINR is provided as an example of a suitable signal quality metric. Alternatively, other signal quality metrics, such as for example signal-to-noise ratio (SNR) or received signal strength, may be used. SINR$_{ILLA}$ may be considered as a first signal quality estimate.

HARQ function 206 may receive and process HARQ feedback from UE 110, similar to FIG. 2. Alternatively, or additionally, HARQ function 206 may determine and transmit HARQ feedback to UE 110, similar to FIG. 3. In both cases, the HARQ feedback may be provided to OLLA function 1000.

BLER estimation function 1002 may determine a BLER estimate (BLER$_{estimate}$) based on acknowledgements (e.g. HARQ feedback) for data blocks of the signal transmitted to UE 110 or received from UE 110. At uplink, gNB 120 may determine the HARQ feedback based on (FEC) decoding results from uplink packet decoding. The decoding results may indicate whether data blocks can be successfully decoded or not. Successful decoding (no error) of an uplink data block may result in an ACK to be transmitted by HARQ function 206 to UE 110. Unsuccessful (erroneous) decoding of an uplink data block may result in a NACK. Therefore, at uplink, BLER estimation function 1002 may use the decoding results of the data blocks for determining the BLER estimate. Acknowledgements or decoding results that are associated with first transmissions, i.e. not retransmissions, of the data packets may be taken into account in the BLER estimation. Retransmissions of the data packets may be ignored.

The BLER estimate may be determined for example recursively based on a previous block error rate estimate and an acknowledgement of a current data block. Initially, the BLER may be set to an initial value, for example 5%, 10%, or 20%. Alternatively, an initial value of the BLER may be set based on the value of the first acknowledgement or decoding result. For example, if a first acknowledgement is NACK or a first (initial) data block is unsuccessfully decoded, the initial value may be set to 100%. If the first acknowledgement is ACK or the first data block is successfully decoded, the initial value may be set to 0%. The current data block may comprise a data block that is subsequent (e.g. transmitted or received later) to data blocks considered for determining the previous BLER estimate.

The current achievable BLER may be tracked using an IIR filter (recursive filter), for example as follows:

$$\text{BLER}_{estimate} = (1-\alpha) \times \text{BLER}_{estimate} + \alpha \times 1_{NACK}, \quad (4)$$

Function $1_{NACK}$ may comprise an indicator function defined for example by $$1_{NACK} = \begin{cases} 1, & \text{if } NACK \\ 0, & \text{if } ACK \end{cases} \quad (5)$$

It is however noted that the indicator function may be generalized as a function that is configured to output a positive value for a NACK of the current data block and a zero or substantially zero value for an ACK of the current data block. A substantially zero value may comprise any value that is low enough for practical applications for a BLER estimation algorithm based on Equation (4). BLER estimation function 1002 may be therefore configured to increase the BLER estimate, in response to a NACK of the current data block. As noted above, decoding results may be used instead of acknowledgements. For example, the indicator function may be configured to output a positive value for unsuccessful decoding of the current data block. The indicator function may be configured to output a substantially zero value for successful decoding of the current data block. The BLER estimate may be also increased in response to unsuccessful decoding of the current data block.

Filter constant $0 < \alpha < 1$ may be used to adjust the relative influence of the previous BLER estimate and the acknowledgement of the current data block. The BLER may be therefore estimated based on a weighted sum of the previous BLER estimate and the output of the indicator function. Value $1/\alpha$ may comprise a time constant of the filter. Example values of a include 0.1, 0.05, 0.01, 0.005, and 0.001. The smaller the value of $\alpha$, the smoother is the BLER estimate. But, the smaller the value of $\alpha$, the less sensitive is the BLER estimate to sudden spikes in BLER.

SINR estimation function 1004 may estimate the SINR of the signal based on the estimated BLER (BLER$_{estimate}$) This SINR estimate may be denoted by SINR$_{estimate}$ and it may be generally referred to as a second signal quality estimate. SINR$_{estimate}$ may be determined from link curves associated with the current operating MCS, or in general transmission parameter(s), based on a SINR value that corresponds to the estimated BLER at respective link curve. A link curve may indicate BLER with respect to SINR for a particular transmission parameter or a set of transmission parameters, for example MCS.

OLLA function 1000 may then determine a signal quality offset based on the different signal quality estimates, for example based on a difference between the inner-loop SINR (SINR$_{ILLA}$) and the BLER based SINR estimate (SINR$_{estimate}$). The difference between SINR$_{estimate}$ and SINR$_{ILLA}$ may be denoted by $\Delta$SINR and it may be determine for example by $$\Delta\text{SINR} = \text{SINR}_{estimate} - \text{SINR}_{ILLA}. \quad (6)$$

This signal quality offset may be further filtered, for example time-averaged, by a filter 1006. Time-averaged $\Delta$SINR may be denoted by $\Delta SINR_{avg}$ and determined for example based on $$\Delta SINR_{avg} = (1-\beta) \times \Delta SINR_{avg} + \beta \times \Delta SINR. \quad (7)$$

Parameter $\beta$ may be used to adjust the influence between a previous value of the time-averaged signal quality estimate (e.g. $\Delta SINR_{avg}$) and a current second (BLER based) signal quality estimate (e.g. $\Delta SINR$). The time-average may therefore comprise a weighted time-average. Example values of include 0.1, 0.05, 0.01, 0.005, and 0.001.

The gNB 120 may determine the outer-loop SINR (SINR$_{OLLA}$) based on the first signal quality estimate (e.g. SINR$_{ILLA}$) and the time-averaged signal quality offset ($\Delta SINR_{avg}$), for example based on a sum of them:

$$SINR_{OLLA} = SINR_{ILLA} + \Delta SINR_{avg}. \quad (8)$$

It is however possible to use the non-filtered signal quality offset (e.g. $\Delta SINR$) instead of the filtered one (e.g. $\Delta SINR_{avg}$). This corresponds to setting $\beta=1$ in Equation (7).

The gNB 120 may then determine transmission parameter(s) for subsequent data block(s) based on the outer loop SINR. For example, MCS determination function 202 may determine a MCS for subsequent data block(s) based on the sum of SINR$_{ILLA}$ and $\Delta SINR_{avg}$. The gNB may transmit an indication of the determined transmission parameter(s) to UE 110. UE 110 may apply the indicated transmission parameter(s) for receiving (e.g. demodulating and/or FEC decoding) the subsequent data block(s).

The example embodiments for determining MCS may therefore use an adaptive BLER based on the channel conditions and be adjusted for any error between the estimated SINR and the currently prevailing SINR.

Figure 11:
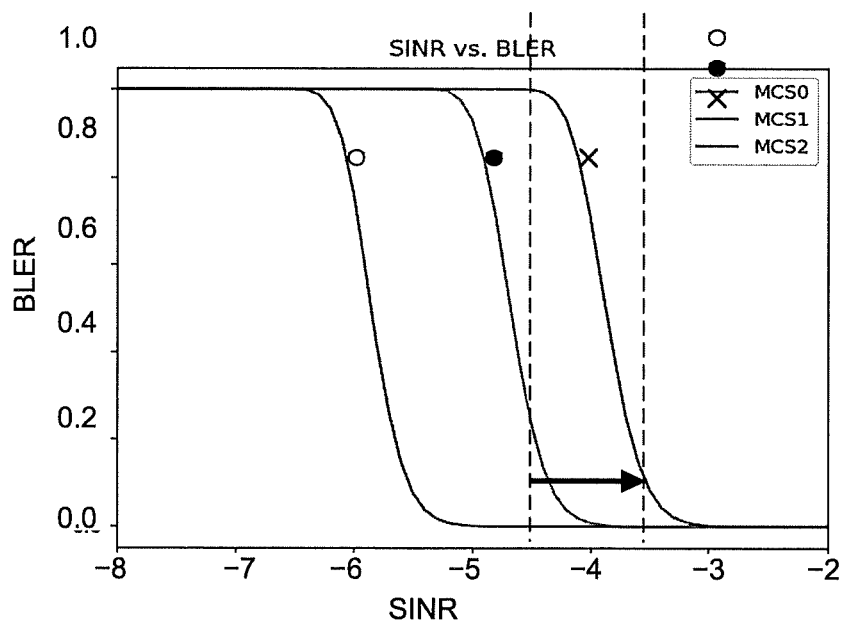
FIG. 11 illustrates an example of BLER for a range of SINR values with three modulation and coding schemes.

FIG. 11 illustrates an example of BLER for a range of SINR values with three modulation and coding schemes. As can be seen from FIG. 11, at several operating SINRs, the optimal BLER is 0% or very close to 0%. In such a scenario, the MCS may get stuck at MCS index i when, in fact, MCS index i+1 may yield a larger throughput. For example, at approximately −5 dB, use of MCS 0 results in 0% BLER. If the currently prevailing SINR were to move to −4 dB, the larger throughput may not be realized, because BLER is expected to be 0%, which is the case with MCS 0. Therefore, the selected MCS may not change for a while once 0% BLER is hit, even though SINR improves from −5 dB to −4 dB, as illustrated by the arrow in FIG. 11.

To overcome this issue, a probing mechanism may be applied. The gNB 120 may increment the signal quality offset (e.g. $\Delta SINR_{avg}$), for example periodically or at irregular intervals. Duration of the period or interval may depend on the amount of increment. This duration may be for example approximately ten times the time it takes to wipe out the previous increment based on ACK/NACK. The duration of the period may be for example set to duration of 10/α slots or transmissions, where α is the filter constant of Equation (4). The probing mechanism may be conditioned on a BLER threshold, which may be equal to zero. For example, if the optimal BLER=0%, then every now and then, for example a period of T seconds, $\Delta SINR_{avg}$ may be incremented by an amount δ such that MCS determination function 202 is caused to increase the MCS index, for example by one. The increment δ may be for example 1 to 3 dB. This may cause an increase of one step in the MCS index. MCS determination function 202 may be therefore caused to switch to an MCSs that has higher spectral efficiency, for example by one step. If the SINR is not good enough to operate at the higher MCS, then the use of signal quality offset may cause selection of a lower MCS, thus pushing $\Delta SINR_{avg}$ down to the same place before the increment. If, on the other hand, the SINR is good enough to operate at the higher MCS, then no further correction to $\Delta SINR$ may occur, enabling the system to benefit from the increased MCS.

The value of T may be tuned, for example depending on the filter constant a, how long it will take to erase the impact of δ, and/or a trade-off between exploration and exploitation. As noted above, the probing mechanism may be advantageously exploited when the optimal operating BLER is 0% (or close to 0%) at a particular SINR. The gNB 120 may therefore increment the signal quality offset, in response determining the block error rate estimate (of first transmissions) to be lower than or equal to a threshold. The threshold may be for example equal to zero. Alternatively, a non-zero threshold, e.g. 0.1%, 1%, or 2%, may be used.

Example embodiments therefore target the objective of maximizing throughput by dynamically adapting the BLER target based on estimated current SINR, corrected based on received HARQ ACK/NACKs. The MCS selection may be further optimized by a probing method for scenarios where the expected BLER is around 0% and that BLER target is being achieved.

In general, example embodiment may apply a dynamic BLER target that is tuned to the current radio channel conditions, as opposed to an approach relying on a static BLER setting across all SINR values, which may result in selection of a sub-optimal MCS and hence lower throughput. The example embodiments enable correction of the current estimated SINR based on observed HARQ feedback, thereby being adjustable for any systematic biases between the estimated and prevailing SINR, or systematic biases in the link curves. The example embodiments may be applied for downlink and/or for uplink.

Figure 12:
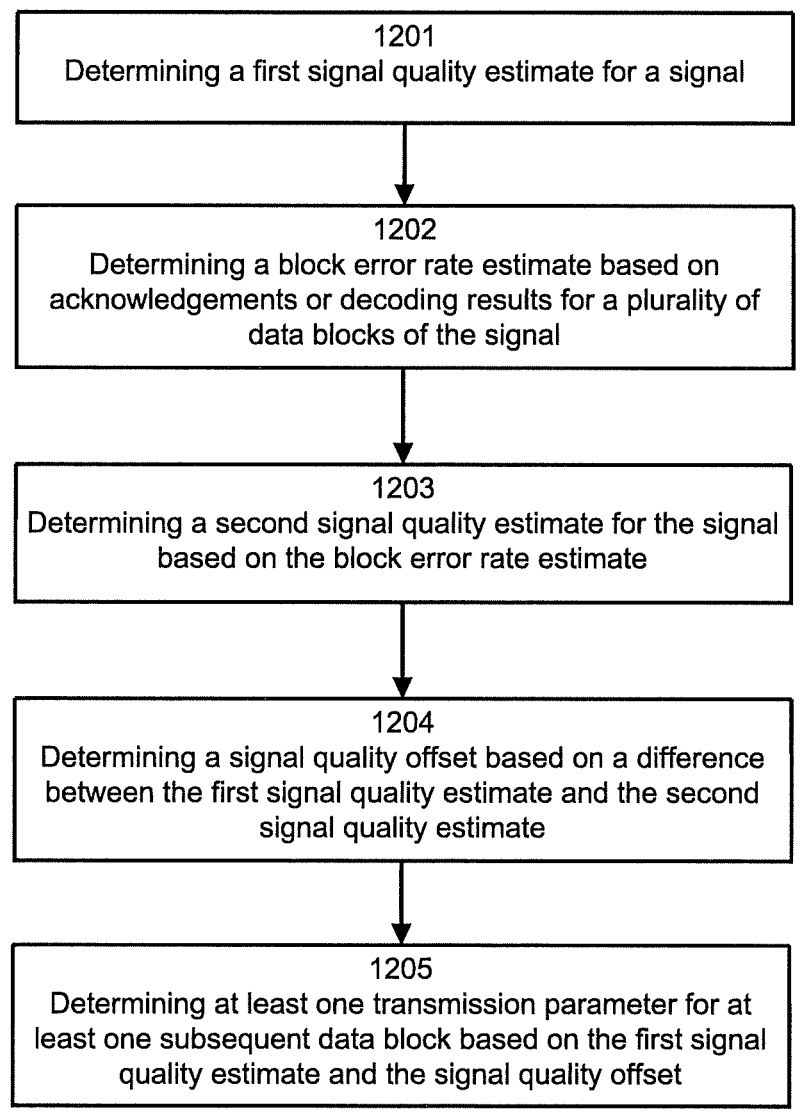
FIG. 12 illustrates an example of a method for link adaptation.

FIG. 12 illustrates an example of a method for link adaptation.

At 1201, the method may comprise determining a first signal quality estimate for a signal.

At 1202, the method may comprise determining a block error rate estimate based on acknowledgements or decoding results for a plurality of data blocks of the signal.

At 1203, the method may comprise determining a second signal quality estimate for the signal based on the block error rate estimate.

At 1204, the method may comprise determining a signal quality offset based on a difference between the first signal quality estimate and the second signal quality estimate.

At 1205, the method may comprise determining at least one transmission parameter for at least one subsequent data block based on the first signal quality estimate and the signal quality offset.

Further features of the methods directly result from the functionalities and parameters of the UE 110 and/or gNB 120, or in general apparatus 400, as described in the appended claims and throughout the specification, and are therefore not repeated here. Different variations of the methods may be also applied, as described in connection with the various example embodiments.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements. Performance of functions 'based on' certain features may comprise performance of the mentioned features, optionally along with other features.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of example embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
   at least one processor; and
   at least one non-transitory memory including computer program code;
   the at least one memory and the computer program code configured to, with the at least one processor, cause the apparatus at least to:
   determine a first signal quality estimate for a signal;
   determine a block error rate estimate based on acknowledgements or decoding results for a plurality of data blocks of the signal;
   determine a second signal quality estimate for the signal based on the block error rate estimate;
   recursively determine the block error rate based on a weighted sum of a previous block error rate estimate and an output of an indicator function,
   wherein the indicator function is configured to output a positive value for a negative acknowledgement or unsuccessful decoding of a current data block and a substantially zero value for a positive acknowledgement or successful decoding of the current data block;
   determine a signal quality offset based on a difference between the first signal quality estimate and the second signal quality estimate; and
   determine at least one transmission parameter for at least one subsequent data block based on the first signal quality estimate and the signal quality offset.

2. The apparatus according to claim 1, wherein the at least one memory and the computer program code are further configured to, with the at least one processor, cause the apparatus to:
   determine the signal quality offset based on a time-average of the difference between the first signal quality estimate and the second signal quality estimate.

3. The apparatus according to claim 1, wherein the at least one memory and the computer program code are further configured to, with the at least one processor, cause the apparatus to:
   transmit, by an access node, the signal to a device;
   receive a channel quality indicator associated with the signal from the device; and
   determine the first signal quality estimate based on the channel quality indicator.

4. The apparatus according to claim 1, wherein the at least one memory and the computer program code are further configured to, with the at least one processor, cause the apparatus to:
   receive, by an access node, the signal from a device;
   equalize the signal; and
   determine the first signal quality estimate based on the equalized signal.

5. The apparatus according to claim 1, wherein the at least one memory and the computer program code are further configured to, with the at least one processor, cause the apparatus to:
   recursively determine the block error rate estimate based on a previous block error rate estimate and an acknowledgement or decoding result of a current data block.

6. The apparatus according to claim 5, wherein the at least one memory and the computer program code are further configured to, with the at least one processor, cause the apparatus to:
   increase the block error rate estimate, in response to a negative acknowledgement of the current data block or in response to the unsuccessful decoding of the current data block.

7. The apparatus according to claim 1, wherein the at least one memory and the computer program code are further configured to, with the at least one processor, cause the apparatus to:

increment the signal quality offset periodically or at irregular intervals.

8. The apparatus according to claim 1, wherein the at least one memory and the computer program code are further configured to, with the at least one processor, cause the apparatus to:
increment the signal quality offset periodically or at irregular intervals, in response to determining the block error rate estimate to be lower than or equal to a threshold.

9. The apparatus according to claim 1, wherein the first signal quality estimate comprises a first signal-to-interference-plus-noise ratio estimate, wherein the second signal quality estimate comprises a second signal-to-interference-plus-noise ratio estimate, and wherein the signal quality offset comprises a signal-to-interference-plus-noise ratio offset.

10. The apparatus according to claim 1, wherein the at least one transmission parameter comprises a modulation and/or a forward error correction coding scheme.

11. The apparatus according to claim 1, wherein the block error rate estimate is determined based on acknowledgements or decoding results for a plurality of non-retransmitted data blocks of the signal.

12. A method, comprising:
determining a first signal quality estimate for a signal;
determining a block error rate estimate based on acknowledgements or decoding results for a plurality of data blocks of the signal;
determining a second signal quality estimate for the signal based on the block error rate estimate;
recursively determining the block error rate based on a weighted sum of a previous block error rate estimate and an output of an indicator function,
wherein the indicator function is configured to output a positive value for a negative acknowledgement or unsuccessful decoding of a current data block and a substantially zero value for a positive acknowledgement or successful decoding of the current data block;
determining a signal quality offset based on a difference between the first signal quality estimate and the second signal quality estimate; and
determining at least one transmission parameter for at least one subsequent data block based on the first signal quality estimate and the signal quality offset.

13. A computer program comprising a non-transitory program storage device comprising instructions for causing an apparatus to perform at least the following:
determining a first signal quality estimate for a signal;
determining a block error rate estimate based on acknowledgements or decoding results for a plurality of data blocks of the signal;
determining a second signal quality estimate for the signal based on the block error rate estimate;
recursively determining the block error rate based on a weighted sum of a previous block error rate estimate and an output of an indicator function,
wherein the indicator function is configured to output a positive value for a negative acknowledgement or unsuccessful decoding of a current data block and a substantially zero value for a positive acknowledgement or successful decoding of the current data block;
determining a signal quality offset based on a difference between the first signal quality estimate and the second signal quality estimate; and
determining at least one transmission parameter for at least one subsequent data block based on the first signal quality estimate and the signal quality offset.

* * * * *